US012811311B2

(12) United States Patent
Tsai et al.

(10) Patent No.: US 12,811,311 B2
(45) Date of Patent: Nov. 24, 2026

(54) PHASED ARRAY ANTENNA DEVICE AND THE MODULAR SCALABLE ANTENNA PACKAGE STRUCTURE THEREOF

(71) Applicant: Phasetrum Inc., Taipei City (TW)

(72) Inventors: Zuo-Min Tsai, Taipei City (TW); Yun-Che Hsieh, Taipei City (TW); Mu-Hsin Yen, Taipei City (TW); Chung-Wang Tsai, Taipei City (TW)

(73) Assignee: PHASETRUM INC., Zhongshan Dist. (TW)

( * ) Notice: Subject to any disclaimer, the term of this patent is extended or adjusted under 35 U.S.C. 154(b) by 31 days.

(21) Appl. No.: 18/641,591

(22) Filed: Apr. 22, 2024

(65) Prior Publication Data

US 2025/0183551 A1 Jun. 5, 2025

(30) Foreign Application Priority Data

Dec. 4, 2023 (TW) ................................ 112147048

(51) Int. Cl.

| | |
|---|---|
| ***H01Q 1/22*** | (2006.01) |
| ***H01Q 9/04*** | (2006.01) |
| ***H01Q 21/00*** | (2006.01) |

(52) U.S. Cl.

CPC ....... *H01Q 21/0025* (2013.01); *H01Q 9/0407* (2013.01); *H01Q 1/2283* (2013.01)

(58) Field of Classification Search

CPC .... H01Q 21/0025; H01Q 1/2283; H01Q 1/38; H01Q 21/065; H01Q 23/00; H01L 2223/6677

See application file for complete search history.

(56) References Cited

U.S. PATENT DOCUMENTS

| | | | | |
|---|---|---|---|---|
| 9,153,863 | B2 * | 10/2015 | Nair | H01Q 1/2283 |
| 10,270,186 | B2 * | 4/2019 | Teshima | H01Q 3/24 |
| 12,218,407 | B2 * | 2/2025 | Lee | H01Q 1/243 |
| 12,418,096 | B2 * | 9/2025 | Astorga | H01Q 3/36 |
| 2012/0280380 | A1 * | 11/2012 | Kamgaing | H01Q 3/26 343/893 |
| 2023/0163485 | A1 | 5/2023 | Cameron | |
| 2023/0395967 | A1 * | 12/2023 | Astorga | H01Q 1/48 |

FOREIGN PATENT DOCUMENTS

| | | | |
|---|---|---|---|
| EP | 3185361 | B1 | 11/2019 |
| JP | 2003309483 | A | 10/2003 |
| TW | 201340459 | A | 10/2013 |
| TW | I777001 | B | 9/2022 |
| TW | I801110 | B | 5/2023 |

* cited by examiner

*Primary Examiner* — Hasan Islam

(74) *Attorney, Agent, or Firm* — McClure, Qualey & Rodack, LLP

(57) ABSTRACT

A phased array antenna device and the modular scalable antenna package structure are provided. The modular scalable antenna package structure is configured for electrically connecting to a main circuit board which includes a signal control module includes. The modular scalable antenna package structure includes a carrier, at least one antenna radiation element and a radio frequency front-end circuit. The carrier includes a first main body which includes a first surface and a second surface disposed opposite to the first surface. The antenna radiation element is disposed on the first surface. The radio frequency front-end circuit is disposed on the second surface and electrically connected to the antenna radiation element and the signal control module of the main circuit board.

15 Claims, 9 Drawing Sheets

100"

PHASED ARRAY ANTENNA DEVICE AND THE MODULAR SCALABLE ANTENNA PACKAGE STRUCTURE THEREOF

BACKGROUND OF THE INVENTION

Field of the Invention

The invention relates to the technology of a phased array antenna device, and more particularly to a phased array antenna device and the modular scalable antenna package structure thereof, wherein antenna radiation elements and radio frequency front-end circuits are modularized and are separately disposed from a signal control module, and the number of antenna radiation elements and radio frequency front-end circuits can be expanded according to the demand.

Description of the Related Art

A phased array antenna device has an antenna array disposed on a plane, in which different antenna elements are fed with different phase shifts. Then, transmission of the wave front of the superposed electromagnetic waves is deviated from the plane, on which the antenna array is disposed, at a deflection angle (beam angle) $\theta_{max}$ shown in FIG. 2 so that the transmitted signals are directional. By varying the phase of the signals transmitted from each antenna, the deflection angle can be varied and the radiated electromagnetic waves can be used for scanning space. Accordingly, the phased array antenna device can be operated as a phased array radar to scan space by electromagnetic waves without any physical movement of the antenna, while a traditional radar is configured to scan space by means of rotation of the antenna.

FIGS. 1 and 2 depict a known phased array antenna device, wherein an array of antenna radiation elements ANTs is disposed on an upper surface M1 of the main circuit board MPCB while a signal transceiver module BT including a modulation and demodulation circuit, a power distribution circuit, a phase shifter circuit and a radio frequency front-end circuit is disposed on a lower surface M2 of the main circuit board MPCB. In order to promote the power and resolution of the antenna device or the radar, the main circuit board generally has five hundred antenna radiation elements (Ku frequency band, 12 GHz-18 GHz) to one thousand antenna radiation elements (Ka frequency band, 27 GHz-40 GHz) and all the circuits of the signal control module are disposed on the back surface of the main circuit board.

As described above, all the antenna radiation elements are disposed on the main circuit board. Such arrangement will lead to reduction of the yield rate of the main circuit boards. For a satellite antenna, the beam angle with accuracy of plus or minus one degree is required. As a result, the phase shift with accuracy of eight bits or more is required. This will increase complexity of the circuit design. Further, the number of layers of the main circuit board is increased to twelve because the antenna radiation elements and the signal control module are disposed on the same main circuit board. This will increase the manufacturing cost and complexity. Further, the accuracy of the beam angle is susceptible to warping of the main circuit board because all the antenna radiation elements are disposed on the main circuit board.

BRIEF SUMMARY OF THE INVENTION

The invention provides a phased array antenna device and the modular scalable antenna package structure thereof, wherein antenna radiation elements and radio frequency front-end circuits are modularized and are separately disposed from the main circuit board. By such arrangement, the yield rate of main circuit boards can be improved, and the complexity of circuit design and the manufacturing cost can be reduced (because the number of layers of the main circuit board can be reduced).

The modular scalable antenna package structure in accordance with an exemplary embodiment of the invention is configured for electrically connecting to a main circuit board which includes a signal control module includes. The modular scalable antenna package structure includes a carrier, at least one antenna radiation element and a radio frequency front-end circuit. The carrier includes a first main body which includes a first surface and a second surface disposed opposite to the first surface. The antenna radiation element is disposed on the first surface. The radio frequency front-end circuit is disposed on the second surface and electrically connected to the antenna radiation element and the signal control module of the main circuit board.

In another exemplary embodiment, the carrier further includes a flange which is disposed on the second surface of the first main body, is extended away from the second surface, and is connected to the main circuit board.

In yet another exemplary embodiment, the flange is disposed at an edge of the second surface of the first main body.

In another exemplary embodiment, the flange is a closed structure. The flange and the first main body are connected to the main circuit board to form a cavity. The radio frequency front-end circuit is disposed in the cavity.

In yet another exemplary embodiment, the flange and the first main body are integrally formed as a continuous-unity structure.

In another exemplary embodiment, the flange is shaped in a frame and includes a first side connected to the first main body.

In yet another exemplary embodiment, the modular scalable antenna package structure further includes a phase shifter circuit, wherein the carrier further includes a second main body, the flange further includes a second side disposed opposite to the first side and connected to the second main body, and the phase shifter circuit is disposed on the second main body and in the cavity.

In another exemplary embodiment, the modular scalable antenna package structure further includes a plurality of first electrical conductors, wherein the first electrical conductors are disposed on the first side of the flange, the first side of the flange is disposed adjacent to the first main body, and the flange is electrically connected to the first main body through the first electrical conductors.

In yet another exemplary embodiment, the modular scalable antenna package structure further includes a plurality of second electrical conductors, wherein the second electrical conductors are disposed on a second side of the flange, and the second side of the flange is disposed distant from the first main body.

In another exemplary embodiment, the modular scalable antenna package structure further includes a plurality of third electrical conductors, wherein the radio frequency front-end circuit is electrically connected to the second surface of the first main body through the third electrical conductors, and the second electrical conductors are larger than the third electrical conductors.

The phased array antenna device in accordance with an embodiment of the invention includes a main circuit board, a modular scalable antenna package structure, and a signal control module. The main circuit board includes a third surface and a fourth surface disposed opposite to the third surface. The modular scalable antenna package structure is disposed on the third surface of the main circuit board. The signal control module is disposed on the main circuit board. The modular scalable antenna package structure includes a carrier, at least one antenna radiation element, and a radio frequency front-end circuit. The carrier includes a first main body. The first main body includes a first surface and a second surface disposed opposite to the first surface. The antenna radiation element is disposed on the first surface. The radio frequency front-end circuit is disposed on the second surface and is electrically connected to the antenna radiation element and the signal control module.

In another exemplary embodiment, the signal control module includes a phase shifter circuit and is disposed on the fourth surface.

In yet another exemplary embodiment, the modular scalable antenna package structure further includes a phase shifter circuit. The carrier further includes a flange and a second main body. The flange includes a first side, and a second side disposed opposite to the first side. The second side is connected to the second main body. The flange and the first main body are connected to the main circuit board to form a cavity. The phase shifter circuit is disposed on the second main body and in the cavity.

In another exemplary embodiment, the signal control module includes a modulation and demodulation circuit and a power distribution circuit.

In the invention, the antenna radiation element and the radio frequency front-end circuit are modularized and combined to form a modular scalable antenna package structure. The signal control module including the modulation and demodulation circuit, the frequency up-down converter circuit and the power distribution circuit is provided on the main circuit board. Therefore, the number of the modular scalable antenna package structures provided on the main circuit board can be determined according to the demand. The number of the antenna radiation elements and the power amplifiers of the modular scalable antenna package structures can be also determined according to the demand. Because the main circuit does not include the antenna radiation elements and the power amplifiers, the number of layers of the main circuit board can be reduced to six, the complexity of structure of the main circuit board is significantly reduced, and the design of the circuits becomes more flexible. Due to the simplified structure of the main circuit board, and the yield rate of the main circuit board and the modular scalable antenna package structure can be significantly increased.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
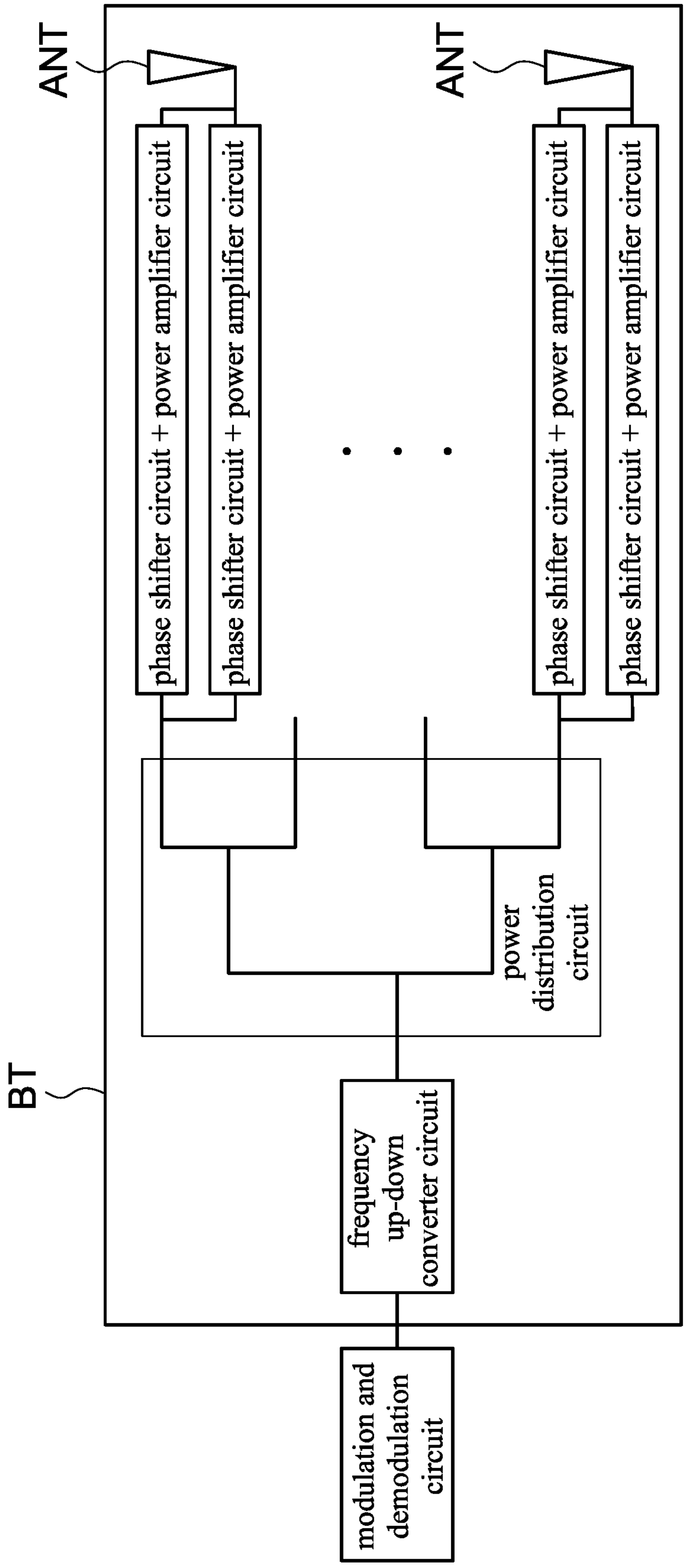
Fig. 1 (PRIOR ART)
FIG. 1 is a block diagram showing a known phased array antenna device.
Figure 2:
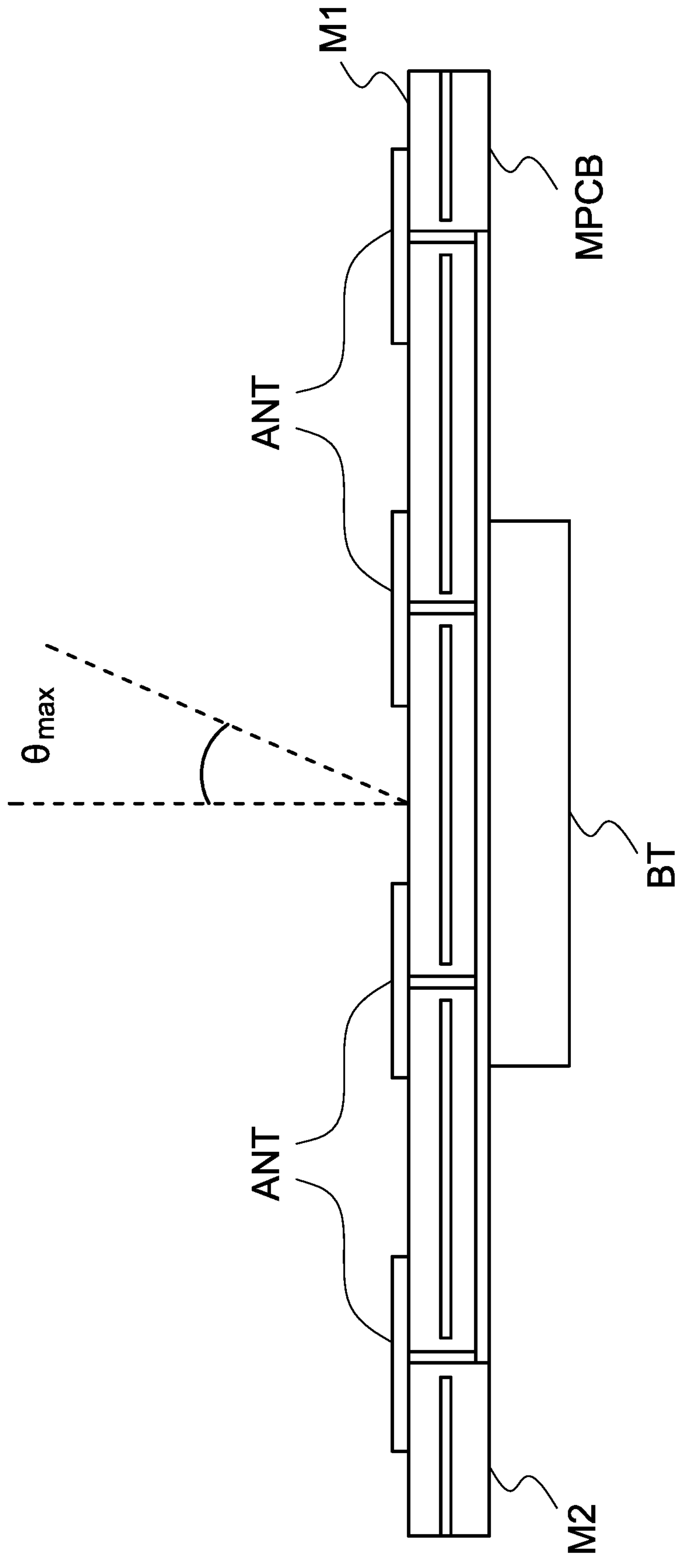
Fig. 2 (PRIOR ART)
FIG. 2 is a sectional view showing a part of structure of the phased array antenna device of FIG. 2.
Figure 3:
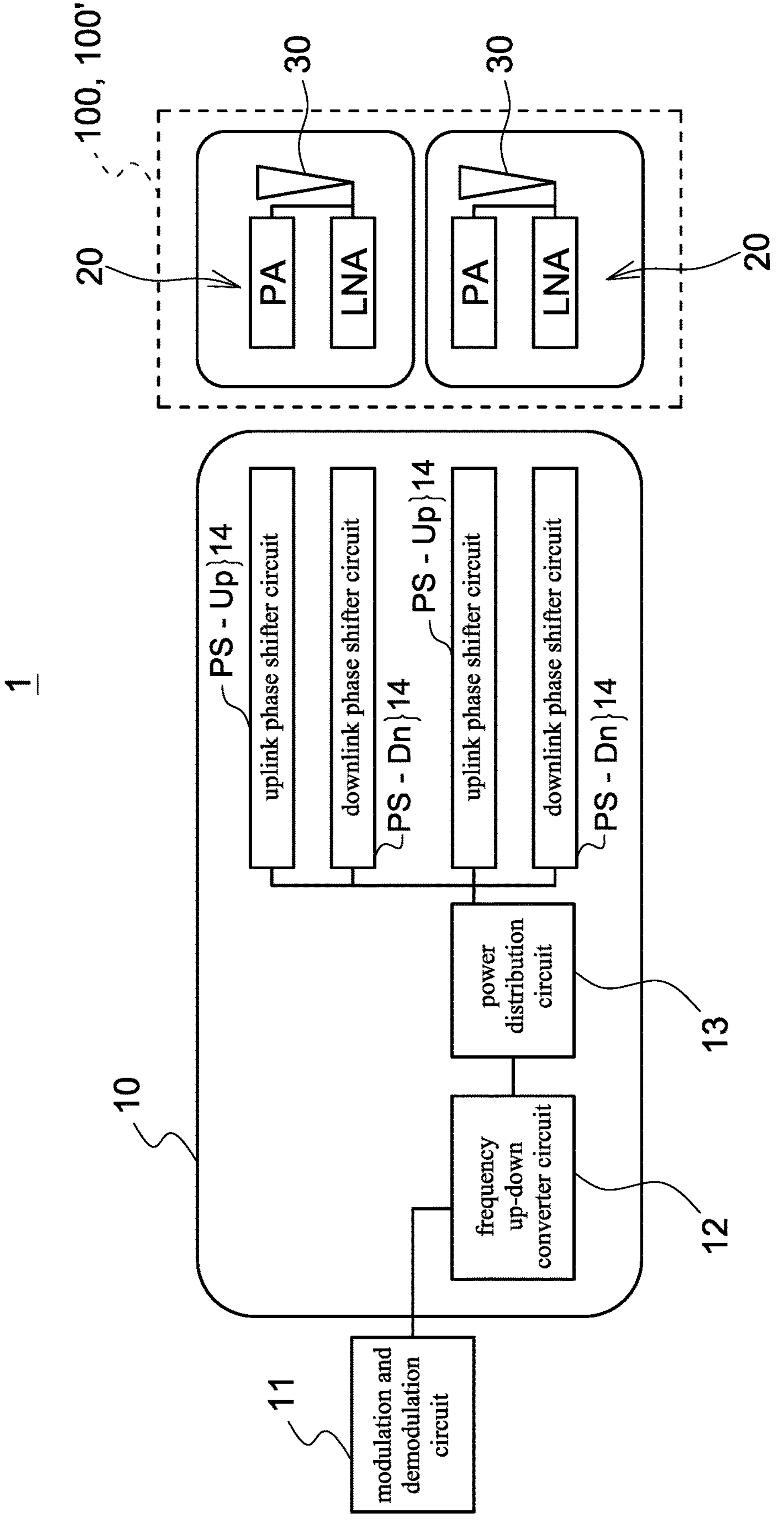
FIG. 3 is a block diagram showing a phased array antenna device and the modular scalable antenna package structure thereof in accordance with a first embodiment and a second embodiment of the invention.
Figure 4:
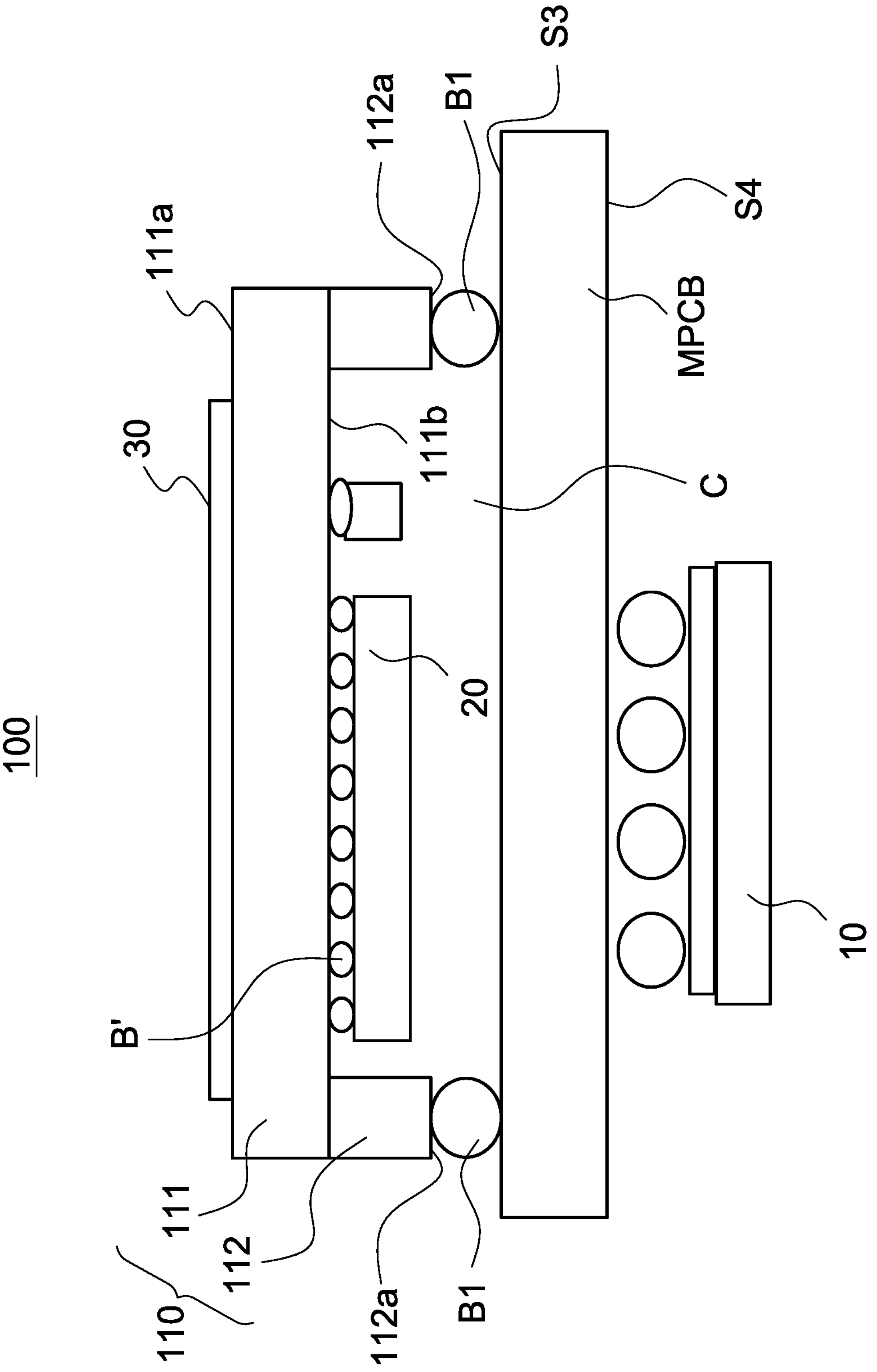
FIG. 4 is a sectional view showing the phased array antenna device and the modular scalable antenna package structure thereof in accordance with the first embodiment of the invention.

FIGS. 3 and 4 depict a phased array antenna device and the modular scalable antenna package structure thereof in accordance with a first embodiment of the invention. In the first embodiment, the phased array antenna device 1 is an active phased array antenna that includes a signal control module 10, a plurality of radio frequency front-end circuits 20 and a plurality of antenna radiation elements 30. The signal control module 10 includes a modulation and demodulation circuit 11, a frequency up-down converter circuit 12, a power distribution circuit 13 and a plurality of phase shifter circuits 14. The radio frequency front-end circuits 20 and the antenna radiation elements 30 are combined and modularized to form a modular scalable antenna package structure 100. The modulation and demodulation circuit 11 of the signal control module 10 is configured to modulate a high frequency carrier wave with a low frequency message signal that is transmitted, or to demodulate a received high frequency signal into a low frequency message signal. The power distribution circuit 13 is configured to distribute signals to the radio frequency front-end circuits 20. The phase shifter circuits 14 are corresponded to the modular scalable antenna package structures 100. The phase shifter circuit 14 includes an uplink phase shifter circuit PS-Up and a downlink phase shifter circuit PS-Dn. The signal control module 10 is a ball grid array (BGA) of an integrated circuit (IC) and is electrically connected to a main circuit board MPCB through solder balls.

The modular scalable antenna package structures 100 and the signal control module 10 are separately arranged. Specifically, the signal control module 10 is disposed on the main circuit board MPCB. The modular scalable antenna package structures 100 are also disposed on the main circuit board MPCB and are electrically connected to the signal control module 10 wherein the number of the modular scalable antenna package structures 100 can be expanded according to the demand. The main circuit board MPCB includes a third surface S3 and a fourth surface S4 disposed opposite to the third surface S3. The modular scalable antenna package structures 100 are disposed on the third surface S3, while the signal control module 10 is disposed on the fourth surface S4.

The radio frequency front-end circuit 20 includes an uplink power amplifier PA and a downlink low-noise amplifier LNA. The uplink power amplifier PA is electrically connected to the uplink phase shifter circuit PS-Up. The downlink low-noise amplifier LNA is electrically connected to the downlink phase shifter circuit PS-Dn. A modulated and up-converted signal can be transmitted from the antenna radiation element 30 to space through the signal uplink. The antenna radiation element 30 can receives electromagnetic waves from space. The electromagnetic waves enter the signal control module 10 through the signal downlink and are down-converted and demodulated to obtain the message signal. The transmission of signal through the uplink or the downlink can be switched by a switch element (not shown).

The modular scalable antenna package structure 100 includes a carrier 110. The radio frequency front-end circuits 20 and the antenna radiation elements 30 are disposed on the carrier 110. In this embodiment, the carrier 110 is a circuit board including a first main body 111. The first main body 111 includes a first surface 111*a* and a second surface 111*b* disposed opposite to the first surface 111*a*. The antenna radiation element 30 is disposed on the first surface 111*a*. Specifically, the antenna radiation element 30 is a copper patch antenna formed on the carrier 110 by plating. The radio frequency front-end circuit 20 is disposed on the second surface 111*b* of the first main body 111 and is electrically connected to the antenna radiation element 30 through copper-plating through holes, copper-plating blind holes, or wires. The radio frequency front-end circuit 20 may be, for example, a ball grid array (BGA) of an integrated circuit (IC), electrically connected to the carrier 110 through solder balls and further electrically connected to the antenna radiation element 30 through the copper-plating through holes, copper-plating blind holes, or wires of the carrier 110.

The carrier 110 further includes a flange 112. The flange 112 is disposed on the second surface 110*b* of the first main body 111 and is extended away from the second surface 110*b*. In this embodiment, the flange 112 is disposed at an edge of the second surface 111*b* of the first main body 111 and is perpendicular to the second surface 111*b* of the first main body 111. Further, the flange 112 has a rectangular cross section which is in a closed shape. As shown in FIG. 4, the flange 112 and the first main body 111 are integrally formed as a continuous-unity structure. When the carrier 110 is formed by layers of epoxy resin, glass fiber and copper, the rectangular flange 112 is simultaneously formed.

The flange 112 has a side (the second side) 112*a* disposed distant from the second surface 111*b* of the first main body 111 and electrically connected to the main circuit board MPCB through a plurality of solder balls (the second electrical conductors) B1. By such arrangement, the radio frequency front-end circuit 20 is electrically connected to the signal control module 10 of the main circuit board MPCB. The second surface 111*b* of the first main body 111 of the carrier 110, the flange 112 and the main circuit board MPCB are connected to form a cavity C. The radio frequency front-end circuit 20 is disposed on the second surface 111*b* of the first main body 111 and is disposed in the cavity C. Since the flange 112 containing a copper layer is connected to the main circuit board MPCB through the solder balls B1, the flange 112 is able to provide an electromagnetic shielding effect by protecting the radio frequency front-end circuit 20 in the cavity C from external electromagnetic waves so as to reduce the noise. Further, the diameter of the solder ball B1 is greater than that of the solder ball B' (the third electrical conductor, electrically connecting the radio frequency front-end circuit 20 and the second surface 111*b* of the first main body 111). Such arrangement facilitates the increment of the modular scalable antenna package structures 100 on the main circuit board MPCB and the assembly of the flange 112 and the main circuit board MPCB.

In this embodiment, the signal control module 10 and the modular scalable antenna package structures 100 are disposed on two opposite surfaces of the main circuit board MPCB. Therefore, the signal control module 10 is disposed at the exterior of the cavity C. However, the invention is not limited thereto. A part of the signal control module 10, for example the phase shifter circuit 14, can be disposed in the cavity C. Further, the solder ball B1 of this embodiment, made of tin, can be replaced with a gold ball or a copper lump.

In this embodiment, four radio frequency front-end circuits 20 and four antenna radiation elements 30 are provided on the carrier 110. However, the number of radio frequency front-end circuits 20 and antenna radiation elements 30 can be changed according to the demand.

Figure 5:
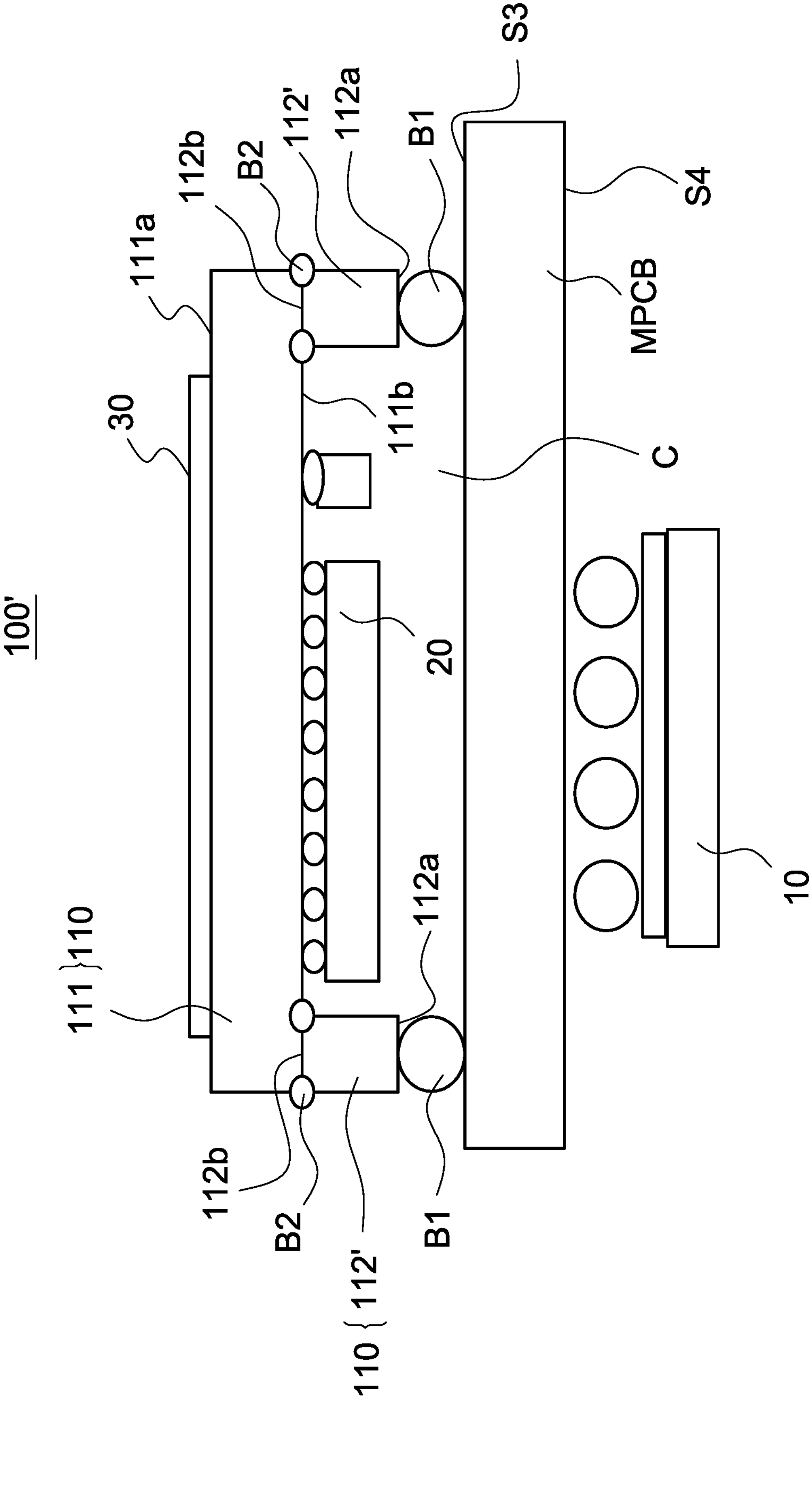
FIG. 5 is a sectional view showing the phased array antenna device and the modular scalable antenna package structure thereof in accordance with the second embodiment of the invention.

FIG. 5 depicts a phased array antenna device and the modular scalable antenna package structure thereof in accordance with a second embodiment of the invention. Some elements of the second embodiment are identical to those of the first embodiment and therefore are labeled with the same symbols, and the descriptions thereof are omitted. The modular scalable antenna package structure 100' of the second embodiment differs from the modular scalable antenna package structure 100 of the first embodiment in that the flange 112' of the carrier 110 of the modular scalable antenna package structure 100' is a frame connected to the first main body 111. The flange 112' is formed by layers of epoxy resin, glass fiber and copper. A side (the first side) 112*b* of the flange 112' adjacent to the second surface 111*b* of the first main body 111 is electrically connected to the first main body 111 through a plurality of solder balls (the first electrical conductors) B2. Another side (the second side) 112*a* of the flange 112' distant from the second surface 111*b* of the first main body 111 is electrically connected to the main circuit board MPCB through a plurality of solder balls (the second electrical conductors) B1. Similar to that of the first embodiment, the flange 112' of the second embodiment is able to provide an electromagnetic shielding effect by protecting the radio frequency front-end circuit 20 in the cavity C from external electromagnetic waves so as to reduce the noise. Further, the solder balls B1, B2 made of tin can be replaced with gold balls or copper lumps.

Figure 6:
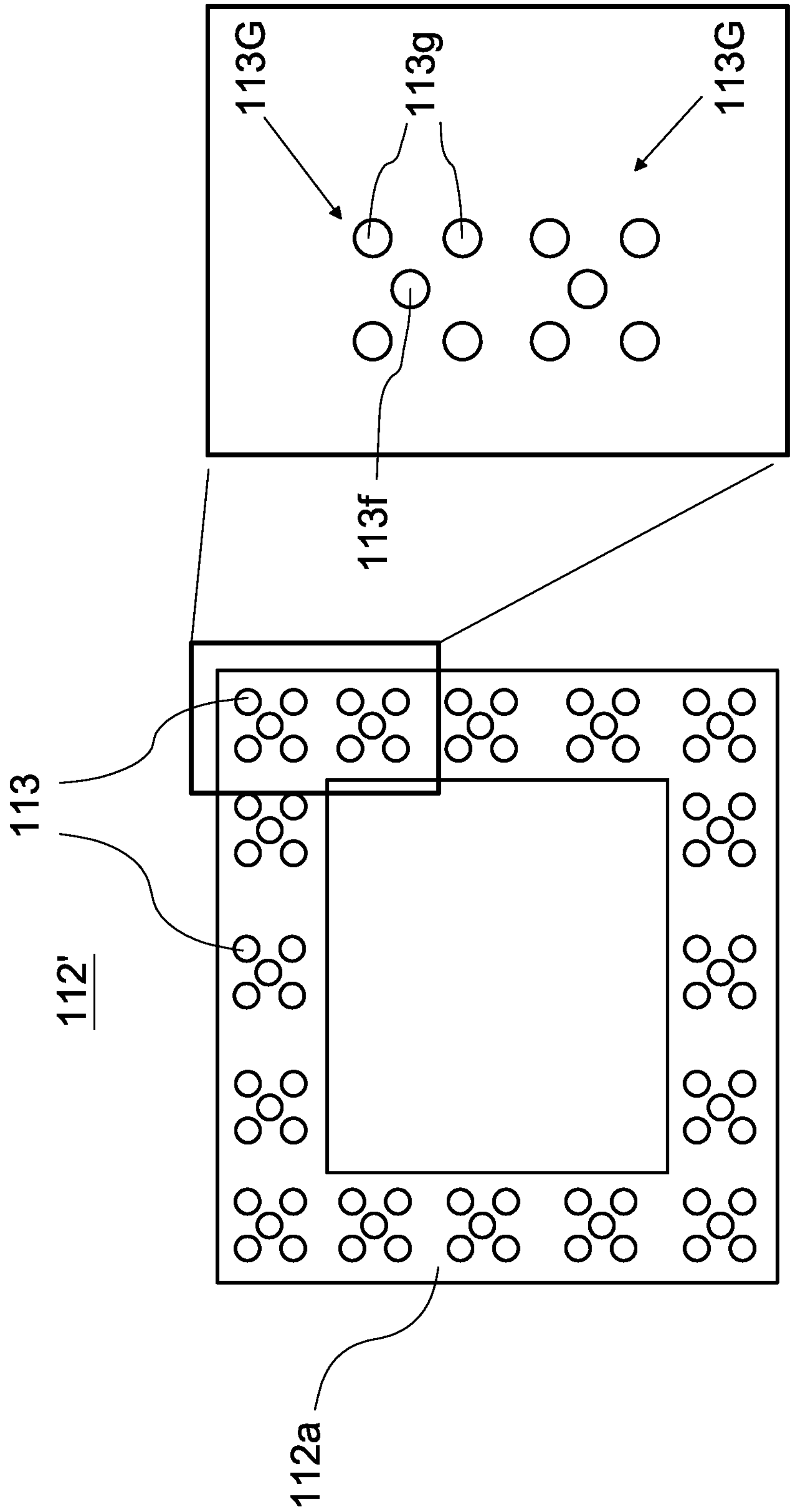
FIG. 6 is sectional view of a flange of FIG. 5.

As shown in FIG. 6, the flange 112' has a special circuit structure for signal transmission to reduce the signal loss. Specifically, the sides 112*a*, 112*b* of the flange 112' are provided with a plurality of bonding pads 113 which are arranged into a plurality of bonding pad groups 113G. Each bonding pad group 113G has a high-frequency signal bonding pad 113*f* surrounded by a plurality of ground bonding pads 113*g*. The ground bonding pad 113*g* is electrically connected to the ground, and the high-frequency signal bonding pad 113*f* is electrically connected to wires which is used for transmitting high-frequency signals. By such arrangement, attenuation of high-frequency signals during transmission by means of the flange 112' can be avoided.

Figure 7:
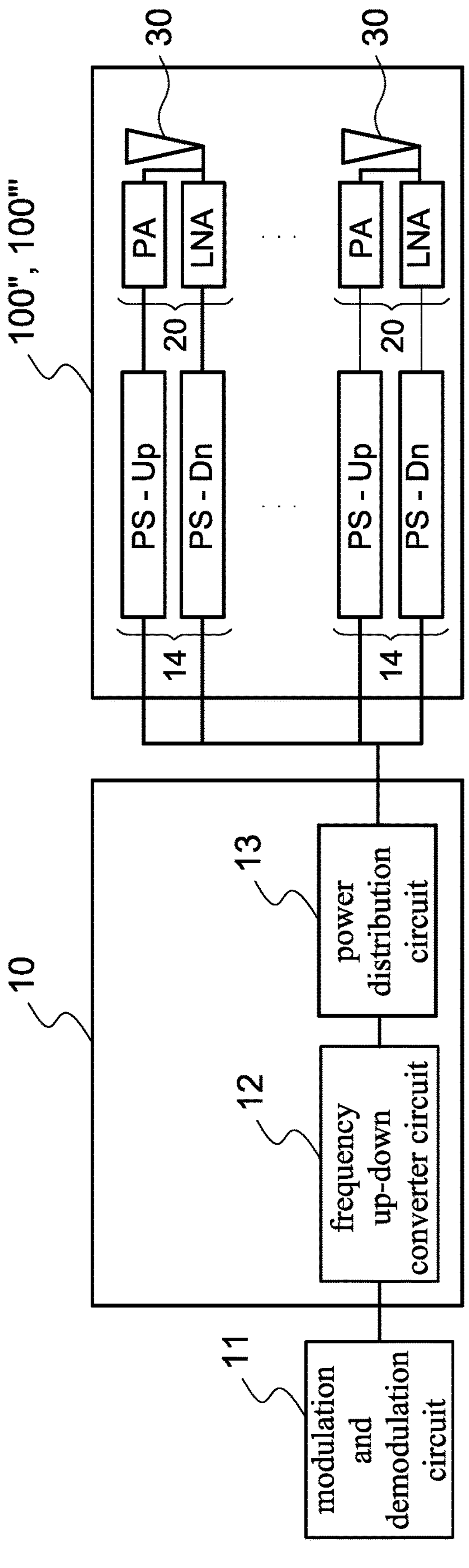
FIG. 7 is a block diagram showing a phased array antenna device and the modular scalable antenna package structure thereof in accordance with a third embodiment and a fourth embodiment of the invention.
Figure 8:
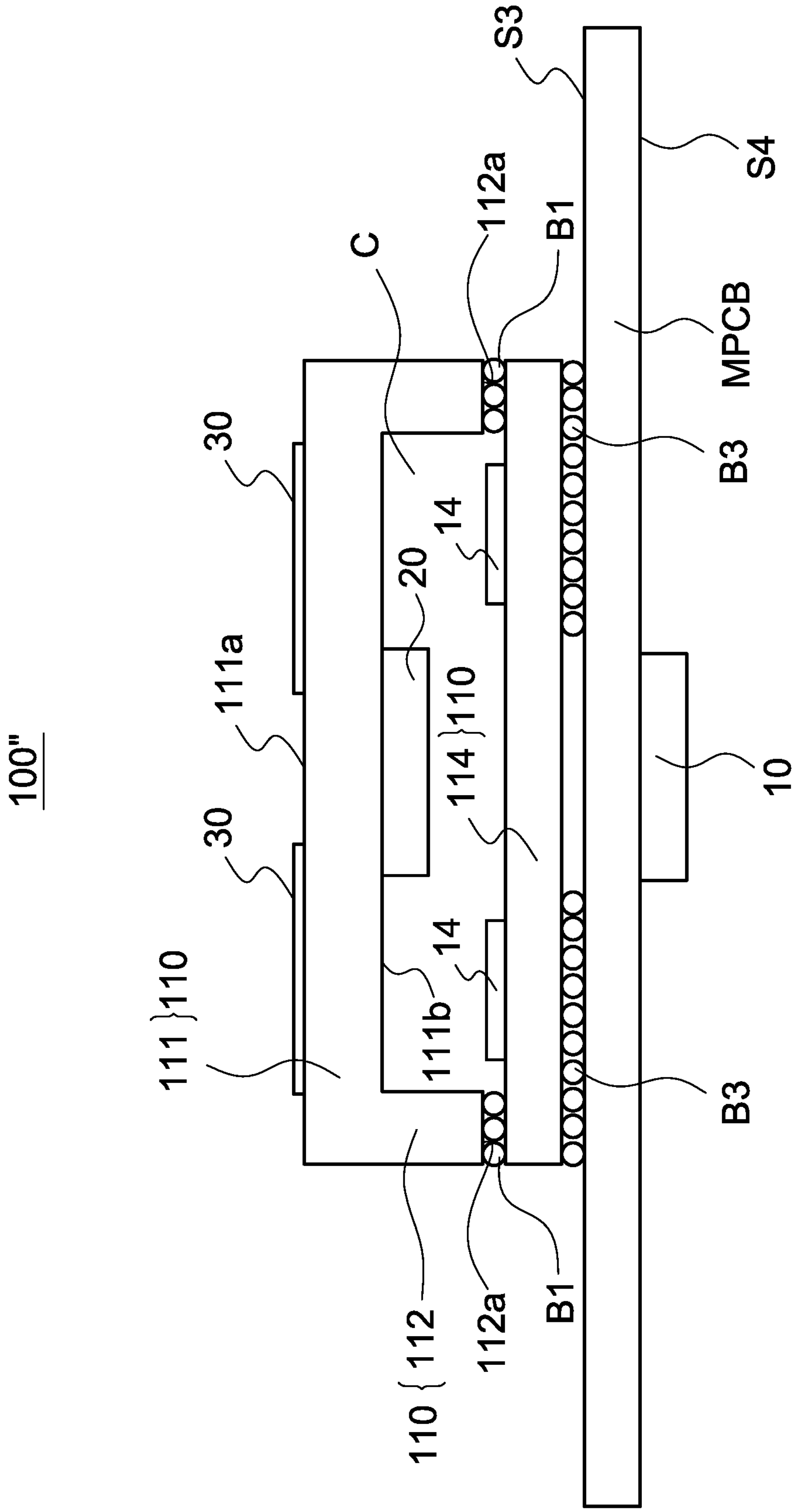
FIG. 8 is a sectional view showing the phased array antenna device and the modular scalable antenna package structure thereof in accordance with the third embodiment of the invention.

FIGS. 7 and 8 depict a phased array antenna device and the modular scalable antenna package structure thereof in accordance with a third embodiment of the invention. Some elements of the third embodiment are identical to those of the first embodiment and therefore are labeled with the same symbols, and the descriptions thereof are omitted. As shown in FIG. 7, the modular scalable antenna package structure

100" of the third embodiment differs from the modular scalable antenna package structure 100 of the first embodiment in that the modular scalable antenna package structure 100" of the third embodiment further includes a phase shifter circuit 14. That is, in the third embodiment, the phase shifter circuit 14 is incorporated into the modular scalable antenna package structure 100".

As shown in FIG. 8, the carrier 110 further includes a second main body 114. The second side 112*a* of the flange 112 is connected to the second main body 114. The phase shifter circuit 14 is disposed on the second main body 114 and in the cavity C. The second main body 114 is a printed circuit board. The flange 112 is electrically connected to the second main body 114 through a plurality of solder balls (the second electrical conductors) B1. The second main body 114 is electrically connected to the main circuit board MPCB through a plurality of solder balls (the third electrical conductors) B3. Therefore, the radio frequency front-end circuits 20 and the phase shifter circuit 14 are electrically connected to the signal control module 10 of the main circuit board MPCB. In the third embodiment, the signal control module 10 includes a modulation and demodulation circuit 11, a frequency up-down converter circuit 12 and a power distribution circuit 13. In some other embodiment, the solder balls B1, B3 can be replaced with gold balls or copper lumps.

Figure 9:
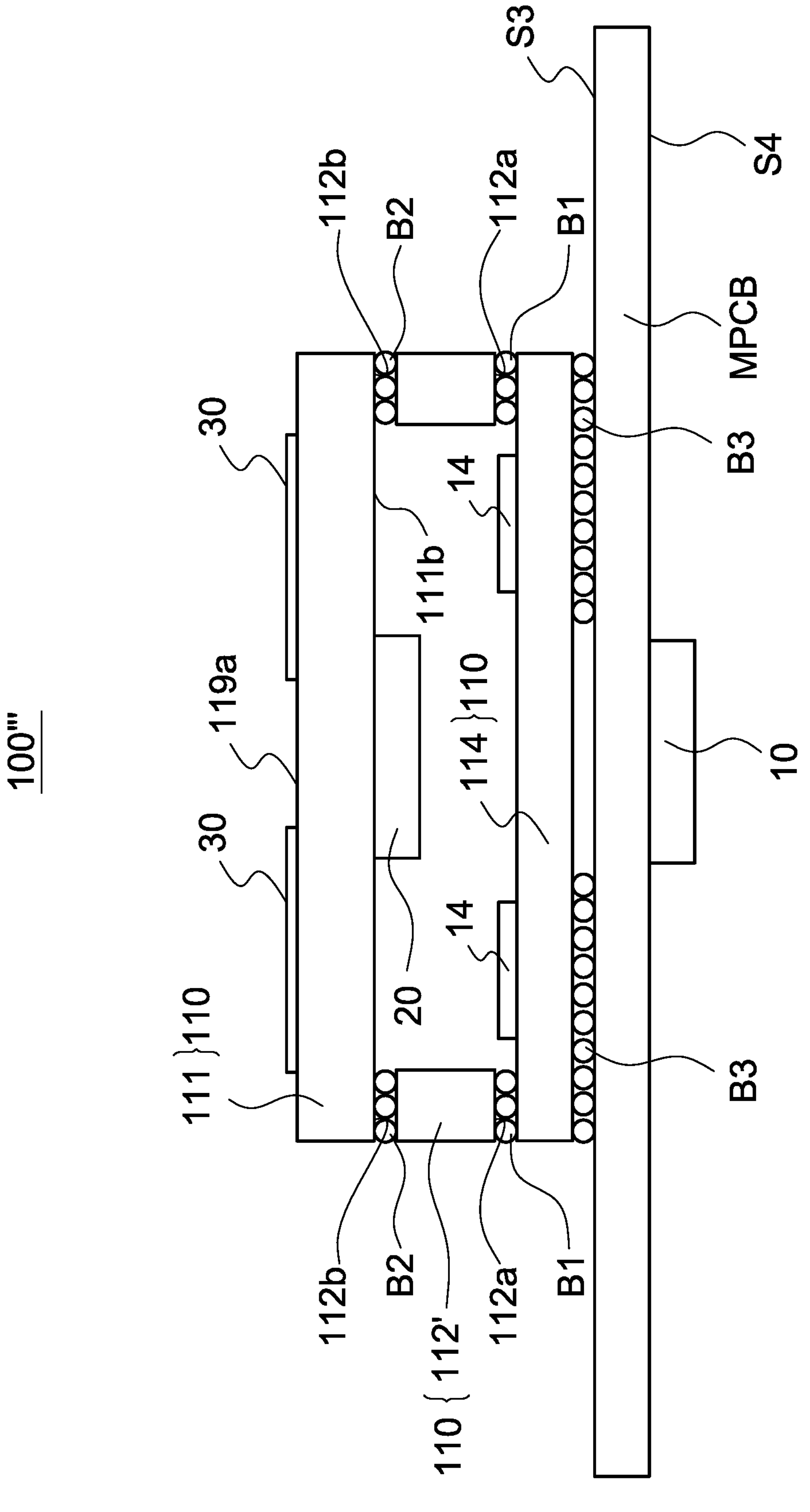
FIG. 9 is a sectional view showing the phased array antenna device and the modular scalable antenna package structure thereof in accordance with the third embodiment of the invention.

FIG. 9 depicts a phased array antenna device and the modular scalable antenna package structure thereof in accordance with a fourth embodiment of the invention. Some elements of the fourth embodiment are identical to those of the second embodiment and therefore are labeled with the same symbols, and the descriptions thereof are omitted. The modular scalable antenna package structure 100''' of the fourth embodiment differs from the modular scalable antenna package structure 100' of the second embodiment in that the modular scalable antenna package structure 100''' of the fourth embodiment further includes a phase shifter circuit 14. That is, in the fourth embodiment, the phase shifter circuit 14 is incorporated into the modular scalable antenna package structure 100'''.

As shown in FIG. 9, the carrier 110 further includes a second main body 114. The second side 112*a* of the flange 112' is connected to the second main body 114. The phase shifter circuit 14 is disposed on the second main body 114 and in the cavity C. The flange 112' is electrically connected to the second main body 114 through a plurality of solder balls (the second electrical conductors) B1. The second main body 114 is electrically connected to the main circuit board MPCB through a plurality of solder balls (the third electrical conductors) B3. Therefore, the radio frequency front-end circuits 20 and the phase shifter circuit 14 are electrically connected to the signal control module 10 of the main circuit board MPCB. In the fourth embodiment, the signal control module 10 includes a modulation and demodulation circuit 11, a frequency up-down converter circuit 12 and a power distribution circuit 13.

In the invention, the antenna radiation element and the radio frequency front-end circuit are modularized and combined to form a modular scalable antenna package structure. The signal control module including the modulation and demodulation circuit, the frequency up-down converter circuit and the power distribution circuit is provided on the main circuit board. Therefore, the number of the modular scalable antenna package structures provided on the main circuit board can be determined according to the demand. The number of the antenna radiation elements and the power amplifiers of the modular scalable antenna package structures can be also determined according to the demand. Because the main circuit does not include the antenna radiation elements and the power amplifiers, the number of layers of the main circuit board can be reduced to six, the complexity of structure of the main circuit board is significantly reduced, and the design of the circuits becomes more flexible. Due to the simplified structure of the main circuit board, the yield rate of the main circuit board and the modular scalable antenna package structure can be significantly increased, and the accuracy of the transmitted and received signals is less affected by warping of the main circuit board.

Only preferred embodiments of the invention are described above, and the scope of the invention is not limited thereto. That is, the simple equivalent changes and modifications made according to the description of the invention and the claims are all within the scope of the invention. Further, any one of the embodiments or claims is not required to achieve all the objects or advantages or features of the invention. Further, the abstract and title are only used to assist in the search of patent documents and are not intended to limit the scope of the invention. Further, the terms "first" and "second" described in the specification and claims are only used to distinguish between different elements, embodiments or scopes, without limiting the quantity of the elements with an upper limit or a lower limit.

What is claimed is:

1. A modular scalable antenna package structure, for electrically connecting to a main circuit board which comprises a signal control module, comprising:

a carrier comprising a first main body which comprises a first surface and a second surface disposed opposite to the first surface;

a plurality of antenna radiation elements disposed on the first surface; and a plurality of radio frequency front-end circuits disposed on the second surface and electrically connected to the antenna radiation elements and the signal control module of the main circuit board;

wherein the carrier further comprises a flange which is disposed on the second surface of the first main body, is extended away from the second surface;

wherein the flange and the first main body are integrally formed as a continuous-unity structure.

2. The modular scalable antenna package structure as claimed in claim 1, wherein the flange is disposed at an edge of the second surface of the first main body.

3. The modular scalable antenna package structure as claimed in claim 1, wherein the flange is a closed structure, the flange and the first main body are connected to the main circuit board to form a cavity, and the radio frequency front-end circuits are disposed in the cavity.

4. The modular scalable antenna package structure as claimed in claim 1, wherein the flange is shaped in a frame and comprises a first side connected to the first main body.

5. The modular scalable antenna package structure as claimed in claim 4, further comprising a phase shifter circuit, wherein the carrier further comprises a second main body, the flange is a closed structure and further comprises a second side disposed opposite to the first side and connected to the second main body to form a cavity, and the phase shifter circuit is disposed on the second main body and in the cavity.

6. The modular scalable antenna package structure as claimed in claim 1, further comprising a plurality of second electrical conductors, wherein the second electrical conductors are disposed on a second side of the flange, and the second side of the flange is disposed distant from the first main body.

7. The modular scalable antenna package structure as claimed in claim 6, further comprising a plurality of third electrical conductors, wherein the radio frequency front-end circuits are electrically connected to the second surface of the first main body through the third electrical conductors, and the second electrical conductors are larger than the third electrical conductors.

8. A modular scalable antenna package structure, for electrically connecting to a main circuit board which comprises a signal control module, comprising:

a carrier comprising a first main body which comprises a first surface and a second surface disposed opposite to the first surface;

a plurality of antenna radiation elements disposed on the first surface; and a plurality of radio frequency front-end circuits disposed on the second surface and electrically connected to the antenna radiation elements and the signal control module of the main circuit board;

wherein the carrier further comprises a flange which is disposed on the second surface of the first main body, is extended away from the second surface;

wherein the modular scalable antenna package structure further comprises a plurality of first electrical conductors, wherein the first electrical conductors are disposed on a first side of the flange, the first side of the flange is disposed adjacent to the first main body, and the flange is electrically connected to the first main body through the first electrical conductors.

9. The modular scalable antenna package structure as claimed in claim 8, further comprising a plurality of second electrical conductors, wherein the second electrical conductors are disposed on a second side of the flange, and the second side of the flange is disposed distant from the first main body.

10. The modular scalable antenna package structure as claimed in claim 9, further comprising a plurality of third electrical conductors, wherein the radio frequency front-end circuits are electrically connected to the second surface of the first main body through the third electrical conductors, and the second electrical conductors are larger than the third electrical conductors.

11. A phased array antenna device, comprising:

a carrier comprising a first main body, the first main body having a first surface and a second surface disposed opposite to the first surface;

a main circuit board comprising a third surface and a fourth surface disposed opposite to the third surface;

a modular scalable antenna package structure disposed on the third surface of the main circuit board; and a signal control module disposed on the main circuit board;

wherein the modular scalable antenna package structure comprises the carrier, a plurality of antenna radiation elements, and a plurality of radio frequency front-end circuits;

wherein the antenna radiation elements are disposed on the first surface;

wherein the radio frequency front-end circuits are disposed on the second surface and are electrically connected to the antenna radiation elements and the signal control module;

wherein the carrier further comprises a flange which is disposed on the second surface of the first main body, and is extended away from the second surface;

wherein the modular scalable antenna package structure further comprises a plurality of first electrical conductors, wherein the first electrical conductors are disposed on a first side of the flange, and the first side of the flange is disposed distant from the first main body.

12. The phased array antenna device as claimed in claim 11, wherein the signal control module comprises a phase shifter circuit and is disposed on the fourth surface.

13. The phased array antenna device as claimed in claim 11, wherein:

the modular scalable antenna package structure further comprises a phase shifter circuit;

the carrier further comprises a second main body;

the flange comprises a second side disposed opposite to the first side;

the first side is connected to the second main body to form a cavity;

the phase shifter circuit is disposed on the second main body and in the cavity.

14. The phased array antenna device as claimed in claim 11, wherein the signal control module comprises a modulation and demodulation circuit and a power distribution circuit.

15. The phased array antenna device as claimed in claim 11, further comprising a plurality of second electrical conductors, wherein the radio frequency front-end circuits are electrically connected to the second surface of the first main body through the second electrical conductors, and the first electrical conductors are larger than the second electrical conductors.

* * * * *